United States Patent
Kuya et al.

(10) Patent No.: US 12,314,035 B1
(45) Date of Patent: May 27, 2025

(54) RECORDING MEDIUM, SIMULATION METHOD, AND SIMULATION DEVICE

(71) Applicant: Mitsubishi Electric Corporation, Tokyo (JP)

(72) Inventors: Ryo Kuya, Tokyo (JP); Visol Ahmed, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/869,302

(22) PCT Filed: Oct. 18, 2022

(86) PCT No.: PCT/JP2022/038832
§ 371 (c)(1),
(2) Date: Nov. 26, 2024

(87) PCT Pub. No.: WO2024/084602
PCT Pub. Date: Apr. 25, 2024

(51) Int. Cl.
*G05B 19/4155* (2006.01)

(52) U.S. Cl.
CPC ............ *G05B 19/4155* (2013.01); *G05B 2219/42163* (2013.01)

(58) Field of Classification Search
None
See application file for complete search history.

(56) References Cited

U.S. PATENT DOCUMENTS

| | | |
|---|---|---|
| 2015/0242548 A1 | 8/2015 | Jones et al. |
| 2016/0246278 A1 * | 8/2016 | Tanide .......... G05B 19/056 |

FOREIGN PATENT DOCUMENTS

| | | |
|---|---|---|
| JP | H08-106380 A | 4/1996 |
| JP | 2001-282327 A | 10/2001 |
| JP | 2010-128722 A | 6/2010 |
| JP | 2017-187947 A | 10/2017 |
| JP | 6433635 B1 | 12/2018 |

OTHER PUBLICATIONS

International Search Report and Written Opinion mailed on Dec. 20, 2022, received for PCT Application PCT/JP2022/038832, filed on Oct. 18, 2022, 08 pages including English Translation.
Notice of Reasons for Refusal mailed on Jun. 13, 2023, received for JP Application 2023-520326, 08 pages including English Translation.
Decision to Grant a Patent mailed on Sep. 26, 2023, received for JP Application 2023-520326, 05 pages including English Translation.
Omron, "Startup Guide for Simulink® & Sysmac Studio", OMRON, 2013-2017, 132 pages including English Translation.

* cited by examiner

*Primary Examiner* — Ryan A Jarrett
(74) *Attorney, Agent, or Firm* — XSENSUS LLP

(57) ABSTRACT

A program causes a simulation device to function as an acquirer that acquires an execution program executable by a programmable controller and system configuration information indicating a configuration of a factory automation system, and a simulator that performs simulations of an operation of the programmable controller and an operation of the factory automation system by synchronizing, in predetermined cycles, a first simulation time of a virtual controller corresponding to the programmable controller and a second simulation time of a virtual system built based on the system configuration information and causes the virtual system to operate based on a virtual output acquired from the virtual controller executing the execution program.

7 Claims, 11 Drawing Sheets

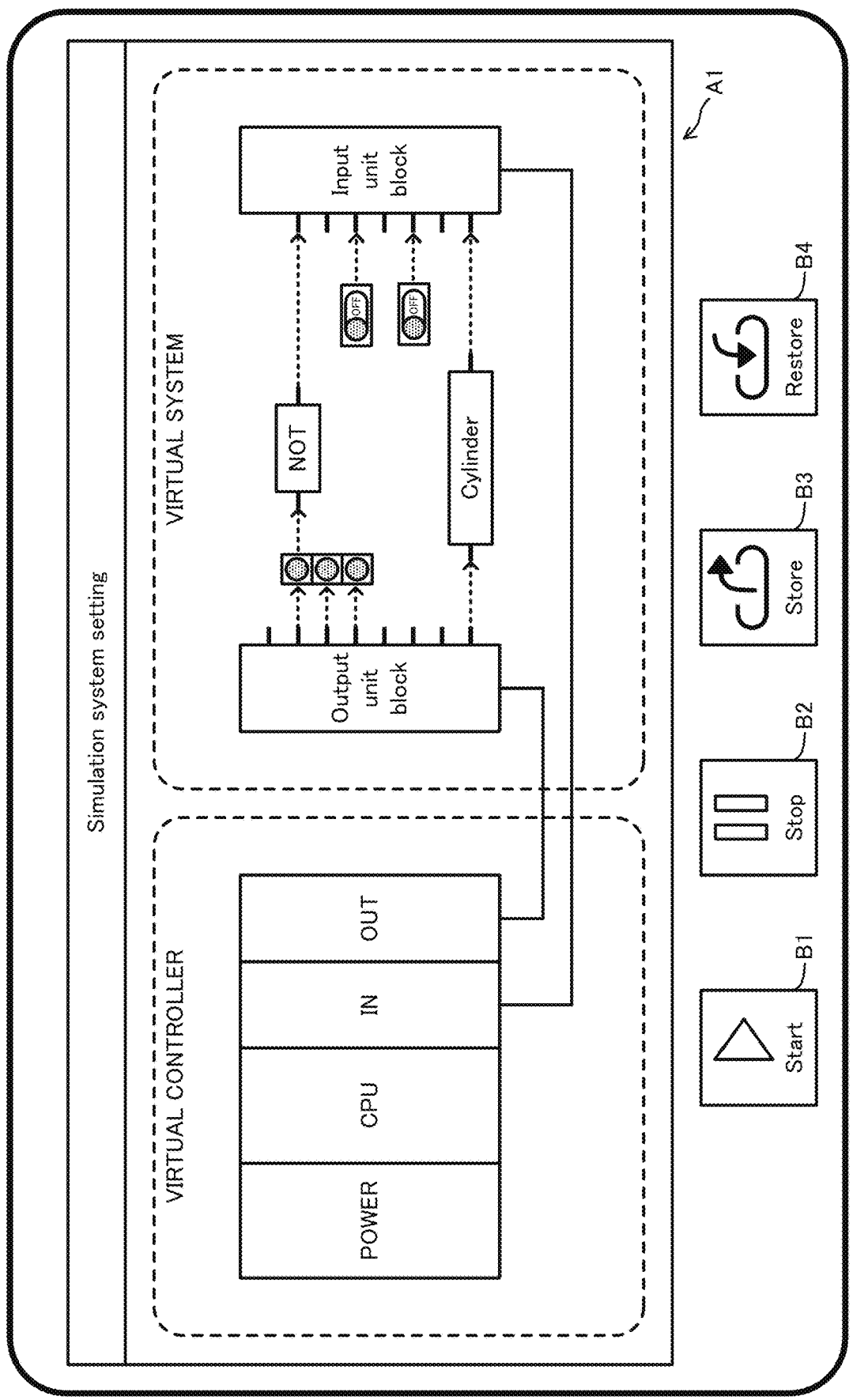

FIG.4

| SYSTEM CONFIGURATION INFORMATION |||
|---|---|---|
| ELEMENT | CONNECTION | STATE AND OPERATION |
| LAMP A | INPUT: OUTPUT UNIT: TERMINAL To2<br>OUTPUT: NOT ELEMENT: INPUT | DEFAULT: TURNED OFF<br>TURNED ON WITH ON INPUT AND TURNED OFF WITH OFF INPUT<br>OUTPUT SIGNAL EQUAL TO INPUT SIGNAL |
| LAMP B | INPUT: OUTPUT UNIT: TERMINAL To3<br>OUTPUT: NONE | DEFAULT: TURNED OFF<br>TURNED ON WITH ON INPUT AND TURNED OFF WITH OFF INPUT<br>OUTPUT SIGNAL EQUAL TO INPUT SIGNAL |
| LAMP C | INPUT: OUTPUT UNIT: TERMINAL To4<br>OUTPUT: NONE | DEFAULT: TURNED OFF<br>TURNED ON WITH ON INPUT AND TURNED OFF WITH OFF INPUT<br>OUTPUT SIGNAL EQUAL TO INPUT SIGNAL |
| NOT ELEMENT | INPUT: LAMP A: OUTPUT<br>OUTPUT: INPUT UNIT: TERMINAL Ti1 | DEFAULT: ---<br>OUTPUT LOGICAL NOT OF INPUT SIGNAL |
| SWITCH D | INPUT: USER INPUT<br>OUTPUT: INPUT UNIT: TERMINAL Ti3 | DEFAULT: OFF<br>SWITCH ON OR OFF UPON USER INPUT<br>OUTPUT CURRENT STATE |
| SWITCH E | INPUT: USER INPUT<br>OUTPUT: INPUT UNIT: TERMINAL Ti5 | DEFAULT: OFF<br>SWITCH ON OR OFF UPON USER INPUT<br>OUTPUT CURRENT STATE |
| CYLINDER | INPUT: OUTPUT UNIT: TERMINAL To8<br>OUTPUT: INPUT UNIT: TERMINAL Ti7 | DEFAULT POSITION: 0 MM<br>INCREMENT BY 1 MM/SEC WITH ON SIGNAL INPUT<br>INCREAMENT BY 5 MM/SEC WITH OFF SIGNAL INPUT<br>OUTPUT ON SIGNAL AT FARTHEST POSITION OF 100 MM |

FIG.5

| CONTROLLER CONFIGURATION INFORMATION ||
|---|---|
| UNIT | DETAIL |
| BASE UNIT | -- |
| EXECUTION UNIT | MOUNT POSITION: 1 |
| INPUT UNIT | MOUNT POSITION: 2 |
| OUTPUT UNIT | MOUNT POSITION: 3 |

FIG.7

| TIME SETTING DATA ||
|---|---|
| COMMAND | EXECUTION TIME ($\mu$s) |
| COMMAND A | 1 |
| ⋮ | ⋮ |

FIG.9
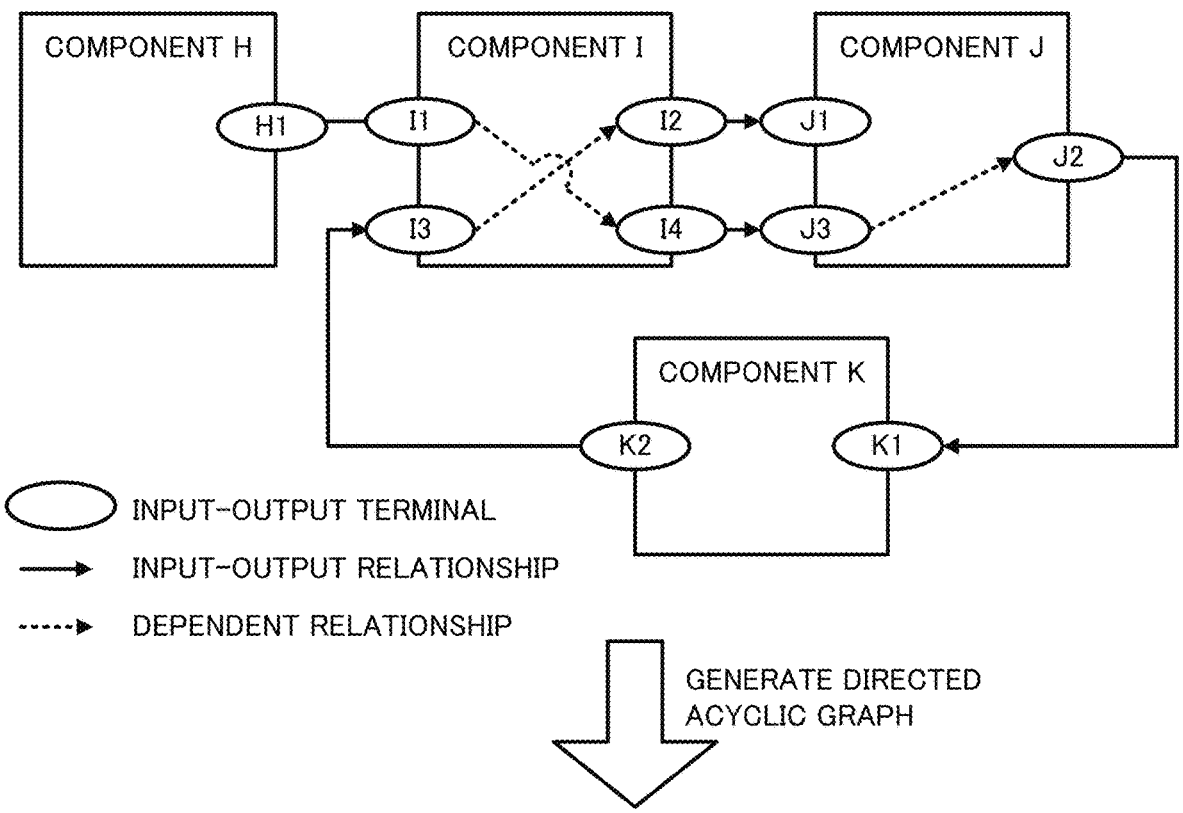
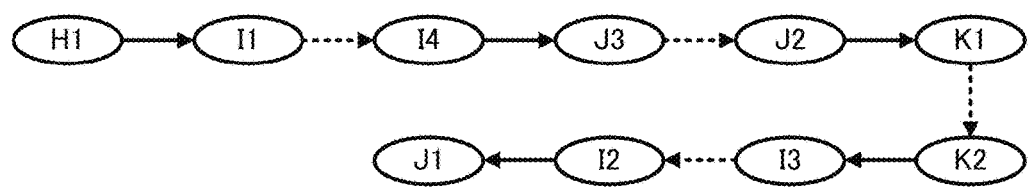

RECORDING MEDIUM, SIMULATION METHOD, AND SIMULATION DEVICE

CROSS-REFERENCE TO RELATED APPLICATION

This application is a national stage application, pursuant to 35 U.S.C. § 371, of International Patent Application No. PCT/JP2022/038832, filed Oct. 18, 2022, the entire contents of which are incorporated herein by reference.

TECHNICAL FIELD

The present disclosure relates to a simulation program, a simulation method, and a simulation device.

BACKGROUND ART

At factory automation (FA) sites, an FA system including various FA devices such as a sensor and a servomotor operates as instructed by a programmable controller to implement various processes. The operation of such an FA system may be simulated in advance to detect any defect, or to verify a program executable by the programmable controller or parameters set for the FA devices (see, for example, Patent Literature 1).

Patent Literature 1 describes a virtual plant simulation system including a simulator that simulates a plant controlled by a controller. With the technique in Patent Literature 1, an operator performs a stop operation to cause the controller to stop operating and remain in the state, and the simulator to stop calculating and remain in the state. The operator performs an activation or execution operation to cause the controller and the simulator to each operate based on an instruction corresponding to the operation.

CITATION LIST

Patent Literature

Patent Literature 1: Unexamined Japanese Patent Application Publication No. 2017-187947

SUMMARY OF INVENTION

Technical Problem

With the technique in Patent Literature 1, the simulator simulates a plant for an actual controller in real time. However, when the simulator also simulates the operation of a programmable controller, no actual programmable controller for simulation is to be built, enabling an earlier verification of a cooperative operation between the programmable controller and the FA system connected to the programmable controller.

In this case, the programmable controller and the FA system are to be simulated separately, rather than integrally, to reduce the load in developing simulation software and to enhance future extensibility. However, when the programmable controller and the FA system are simulated in parallel and the stop operation is performed, the time in one simulation may not be the same as the time in the other simulation. In other words, the simulations may be stopped with the operations simulated up to different times. The simulations may thus have different degrees of progress when restarting from the stop states, failing to simulate the programmable controller and the FA system accurately.

Under such circumstances, an objective of the present disclosure is to simulate the programmable controller and the FA system accurately.

Solution to Problem

To achieve the above objective, a simulation program according to an aspect of the present disclosure is executable by a computer to simulate an operation of a programmable controller and an operation of a system operable based on an output from the programmable controller. The simulation program causes the computer to function as acquisition means for acquiring an execution program executable by the programmable controller to generate the output from the programmable controller and acquiring system configuration information indicating a configuration of the system, and simulation means for performing simulations of the operation of the programmable controller and the operation of the system by synchronizing, in predetermined cycles, a first simulation time of a virtual controller corresponding to the programmable controller and a second simulation time of a virtual system built based on the system configuration information and causing the virtual system to operate based on a virtual output acquired from the virtual controller executing the execution program. The acquisition means acquires a stop instruction to stop the simulations performed by the simulation means. The simulation means stops, when the acquisition means acquires the stop instruction, the simulations of the operation of the virtual controller and the operation of the virtual system at a timing to synchronize the first simulation time and the second simulation time.

Advantageous Effects of Invention

In the simulation program according to the above aspect of the present disclosure, the simulation means stops the simulations of the operations at the timing to synchronize the first simulation time and the second simulation time. This allows the simulations of the operations of the programmable controller and the system to restart with the same degree of progress. The programmable controller and the FA system can thus be simulated accurately.

BRIEF DESCRIPTION OF DRAWINGS

FIG. 3 is a diagram illustrating example information set for the simulation device according to the embodiment;

FIG. 4 is a table of example system configuration information in the embodiment;

FIG. 5 is a table of example controller configuration information in the embodiment;

FIG. 7 is a table of example time setting data in the embodiment;

FIG. 9 is a diagram illustrating example generation of a directed acyclic graph in the embodiment;

DESCRIPTION OF EMBODIMENTS

A simulation device that executes a simulation program according to one or more embodiments of the present disclosure is described in detail below with reference to the drawings.

Embodiment

Figure 1:
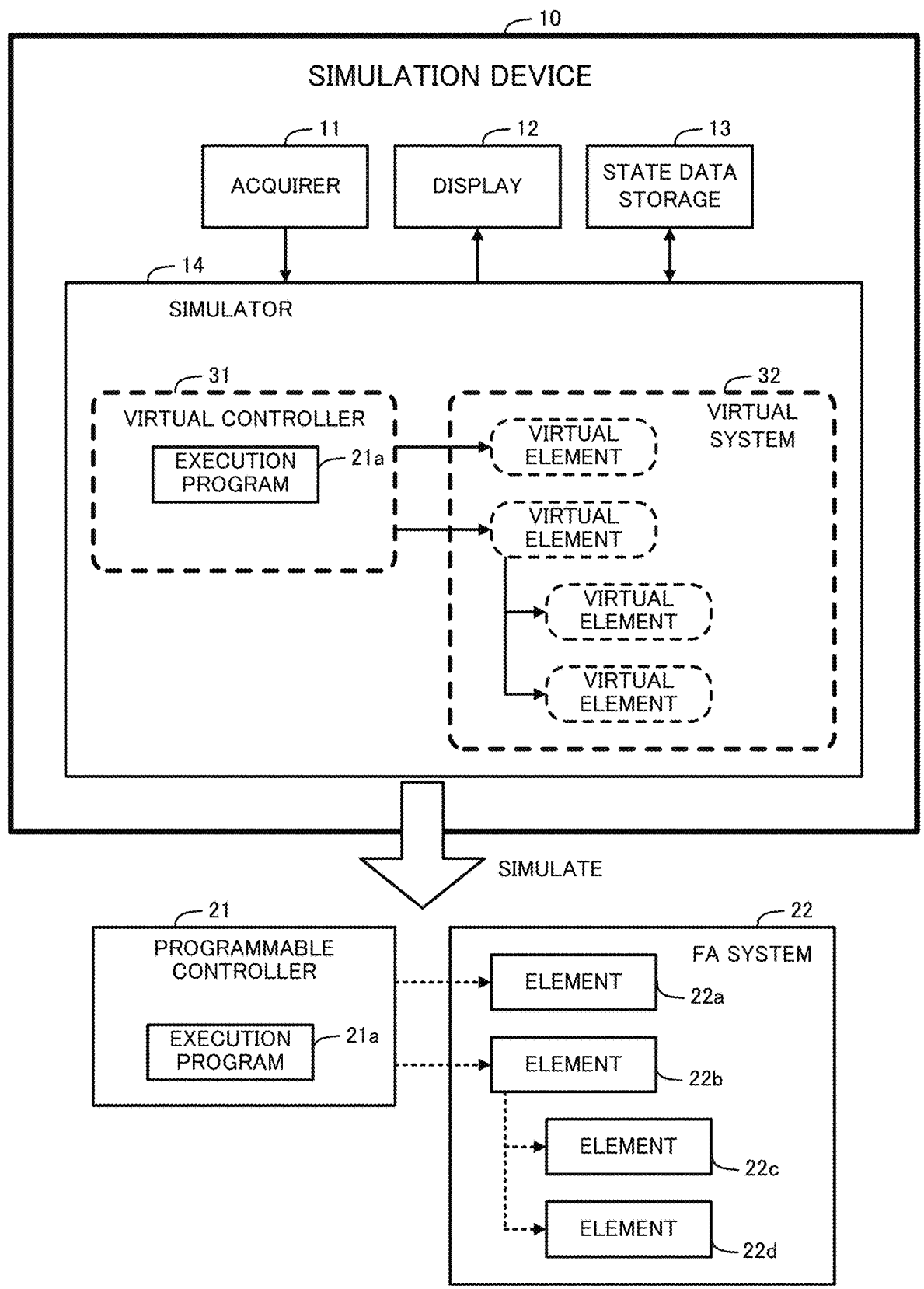
FIG. 1 is a block diagram of a simulation device according to an embodiment.

As illustrated in FIG. 1, a simulation device 10 according to the present embodiment is a computer that simulates operations of a programmable controller 21 and a factory automation (FA) system 22 on software, such as an industrial personal computer (PC), a tablet, or a server device on a network.

The programmable controller 21 is connected to the FA system 22 with a communication line. The communication line may be a wire that transmits a current signal or a voltage signal, a signal line that transmits serial data, or an industrial network. The communication line may be a single line or multiple lines. The programmable controller 21 may be connected to the FA system 22 with multiple communication lines of different types.

The programmable controller 21 executes an execution program 21a to output a signal to the FA system 22. The execution program 21a is, for example, a ladder program written with ladder logic or a program written in another language. The execution program 21a may be any program describing a signal to be output to the FA system 22 and the procedure.

The FA system 22 operates based on a signal output from the programmable controller 21. The FA system 22 includes one or more elements. When the FA system 22 includes multiple elements, the elements may be connected to one another. More specifically, each element may be connected to another element to perform at least one of receiving a signal output from the other element or transmitting a signal to the other element. Each element changes the state based on a signal received from another element.

As illustrated in FIG. 1, when the FA system 22 includes elements 22a, 22b, 22c, and 22d, the element 22a is, for example, a lamp or a light-emitting diode (LED) that is turned on when receiving an ON signal from the programmable controller 21 and turned off when receiving an OFF signal. The element 22b may be a servo amplifier that drives the elements 22c and 22d that are servomotors based on a control instruction from the programmable controller 21. The elements included in the FA system 22 are not limited to the above examples, and may each be a logical operator, a display such as an LED or a liquid crystal display (LCD), a gauge, a sensor, a switch, an actuator, a servo amplifier, a servomotor, another motor, a valve, a robot, a machine tool, or another FA device. Any of the elements may be a programmable controller other than the programmable controller 21, or the FA system 22 may include no programmable controller. The FA system 22 operates based on the output from the programmable controller 21 to perform various processes at a factory, such as manufacturing, machining process, inspecting, and monitoring.

As illustrated in FIG. 1, the FA system 22 includes the elements 22b, 22c, and 22d that are connected to one another and further includes the element 22a that is connected to no other elements. The FA system 22 may include multiple elements connected to the programmable controller 21 without being connected to other elements.

Figure 2:
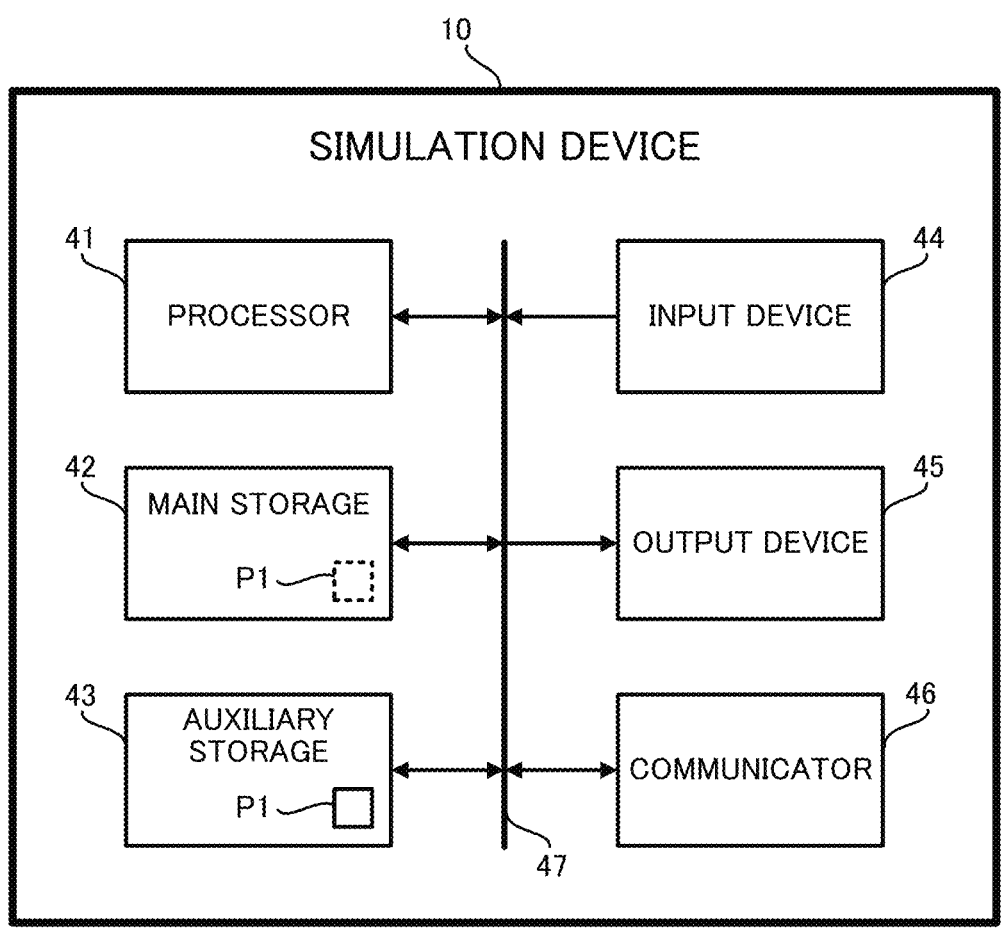
FIG. 2 is a block diagram of the simulation device according to the embodiment, illustrating the hardware configuration.

The simulation device 10 executes software for simulating the operations of the programmable controller 21 and the FA system 22 based on the execution program 21a without actually building the programmable controller 21 and the FA system 22 described above. To execute such software, the simulation device 10 has the hardware configuration as illustrated in FIG. 2. More specifically, the simulation device 10 includes a processor 41, a main storage 42, an auxiliary storage 43, an input device 44, an output device 45, and a communicator 46. The main storage 42, the auxiliary storage 43, the input device 44, the output device 45, and the communicator 46 are connected to the processor 41 with an internal bus 47.

The processor 41 includes a central processing unit (CPU) as a processing circuit. The processor 41 executes a program P1 stored in the auxiliary storage 43 to implement various functions of the simulation device 10 and perform the processes described later.

The main storage 42 includes a random-access memory (RAM). The program P1 is loaded into the main storage 42 from the auxiliary storage 43. The main storage 42 is used as a work area for the processor 41. Although FIG. 2 illustrates a single program P1 as a typical example, multiple programs P1 may be loaded. For example, in addition to the program P1 corresponding to the software for simulation, a program P1 corresponding to an engineering tool for editing the execution program 21a may be loaded. The program P1 for simulation corresponds to an example of a simulation program.

The auxiliary storage 43 includes a nonvolatile memory such as an electrically erasable programmable read-only memory (EEPROM) or a hard disk drive (HDD). The auxiliary storage 43 stores, in addition to the program P1, various sets of data used for processing performed by the processor 41. The auxiliary storage 43 provides data usable by the processor 41 to the processor 41 as instructed by the processor 41, and stores data provided from the processor 41.

The input device 44 includes input devices such as a keyboard and a pointing device. The input device 44 acquires information input by a user of the simulation device 10 and provides the acquired information to the processor 41.

The output device 45 includes output devices such as a liquid crystal display (LCD) and a speaker. The output device 45 presents various items of information to the user as instructed by the processor 41.

The communicator 46 includes a network interface circuit for communicating with an external device. The communicator 46 receives a signal from the external device and outputs information indicated by the signal to the processor 41. The communicator 46 also transmits a signal indicating information output from the processor 41 to the external device.

The input device 44 and the output device 45 correspond to a user interface (UI) of the simulation device 10. Instead, the simulation device 10 may be connected to an external UI through the communicator 46 to acquire and provide information from and to the user through the communicator 46. When an external UI is used as the UI of the simulation device 10 in place of the input device 44 and the output device 45, the input device 44 and the output device 45 may be eliminated, and the communicator 46 may receive and provide information for the UI.

Referring back to FIG. 1, the simulation device 10 includes functional components implemented by the above hardware components working in cooperation. More specifically, the simulation device 10 includes an acquirer 11 that acquires various items of information, a display 12 that displays information about a simulation to the user, a state data storage 13 that stores state data indicating a state of the simulation in progress at a specific timing, and a simulator 14 that simulates the operations of the programmable controller 21 and the FA system 22 by causing a virtual controller 31 and a virtual system 32 that are virtually built to operate in the same manner as the programmable controller 21 and the FA system 22.

The acquirer 11 and the display 12 are implemented by the input device 44 and the output device 45 as the UI and the processor 41 that executes the engineering tool. The simulator 14 is implemented by the processor 41 that executes the software for simulation. The simulation device 10 corresponds to an example of a simulation device that simulates the operations of a programmable controller and a system that operates based on an output from the programmable controller.

The acquirer 11 acquires the execution program 21a and system configuration information indicating the configuration of the FA system 22. More specifically, the acquirer 11 may acquire the execution program 21a and the system configuration information directly input by the user, or read the execution program 21a and the system configuration information from the address of the auxiliary storage 43 or an external storage specified by the user. The execution program 21a is executed by the virtual controller 31, and the system configuration information is used to build the virtual system 32. The acquirer 11 corresponds to an example of acquisition means for acquiring an execution program executable by the programmable controller to generate an output from the programmable controller, and system configuration information indicating the configuration of the system.

FIG. 3 illustrates an example screen for inputting the system configuration information. As indicated in a Virtual system section in the upper right area in FIG. 3, the user may arrange objects corresponding to the elements included in the FA system 22 and connect the objects with lines to input the elements included in the FA system and the relationship between the elements. The virtual system 32 thus includes the elements connected in the same manner as in the FA system 22.

In the example in FIG. 3, an Output unit block corresponding to an output unit included in the virtual controller 31 outputs a signal from each of the second to fourth terminals to corresponding one of three lamps. The signal input into the uppermost lamp is further input, through a NOT element, into the first terminal of an Input unit block corresponding to an input unit included in the virtual controller 31. Outputs from two switches are respectively input into the third and fifth terminals of the Input unit block. A signal from the eighth terminal of the Output unit block is input into a Cylinder, and a signal from the Cylinder is input into the seventh terminal of the Input unit block.

The Output unit block and the Input unit block are substantially the components of the virtual controller 31, rather than the virtual system 32, to transmit and receive a signal to and from the external device, but are displayed for convenience to clarify the connections between the elements in the virtual system 32 and the virtual controller 31. As illustrated in FIG. 3, the FA system 22 is normally a control target of the programmable controller 21. The FA system 22 may output a signal that is fed back to the programmable controller 21 to build a closed-loop system.

The user may input the detailed operation of the Cylinder illustrated in FIG. 3 using a subwindow displayed when the Cylinder block is selected, or may separately specify a file describing the detailed operation. The detailed operation of each element included in the FA system is information that indicates the change in the state of the element based on the signal input into the element, and is included in the system configuration information. For example, the detailed operation of the cylinder indicates that the cylinder increments the position by 1 mm per second when an ON signal is input into the cylinder, and outputs an ON signal when the cylinder reaches at 100 mm being the farthest position.

Based on the block diagram as illustrated in FIG. 3, the acquirer 11 acquires the system configuration information as illustrated in the table in FIG. 4. The user may directly input the table illustrated in FIG. 4 instead of the block diagram, or the simulation device 10 may acquire the system configuration information presented in another format. The system configuration information may be any information that indicates multiple elements, the connection relationship between the elements, and the state of each element.

When the programmable controller 21 is a building-block programmable logic controller (PLC) including a combination of multiple units as illustrated with the virtual controller 31 in FIG. 3, the acquirer 11 may acquire controller configuration information indicating the configuration of the programmable controller 21. The user may input the controller configuration information in the form of a block diagram as illustrated in the Virtual controller section in the upper left area in FIG. 3, or in the form of a table as illustrated in FIG. 5.

The controller configuration information in FIG. 5 indicates units mounted on a base unit, and the mount position of each unit on the base unit. An Execution unit in FIG. 5 executes the execution program 21a and corresponds to the CPU in FIG. 3. An Input unit in FIG. 5 corresponds to IN in FIG. 3, and an Output unit in FIG. 5 corresponds to OUT in FIG. 3. The programmable controller 21 and the virtual controller 31 may further include other units as units mounted on the base unit. Examples of the other units include a motion unit connected to a servo amplifier to control a servo system with high accuracy, a servo amplifier unit, a network unit to communicate through a network, an input-output unit having at least one of the function of the input unit or the function of the output unit, and a remote input-output unit. When information about connections between the units is used to build the programmable controller 21, the controller configuration information includes the information about the connections.

Figure 6:
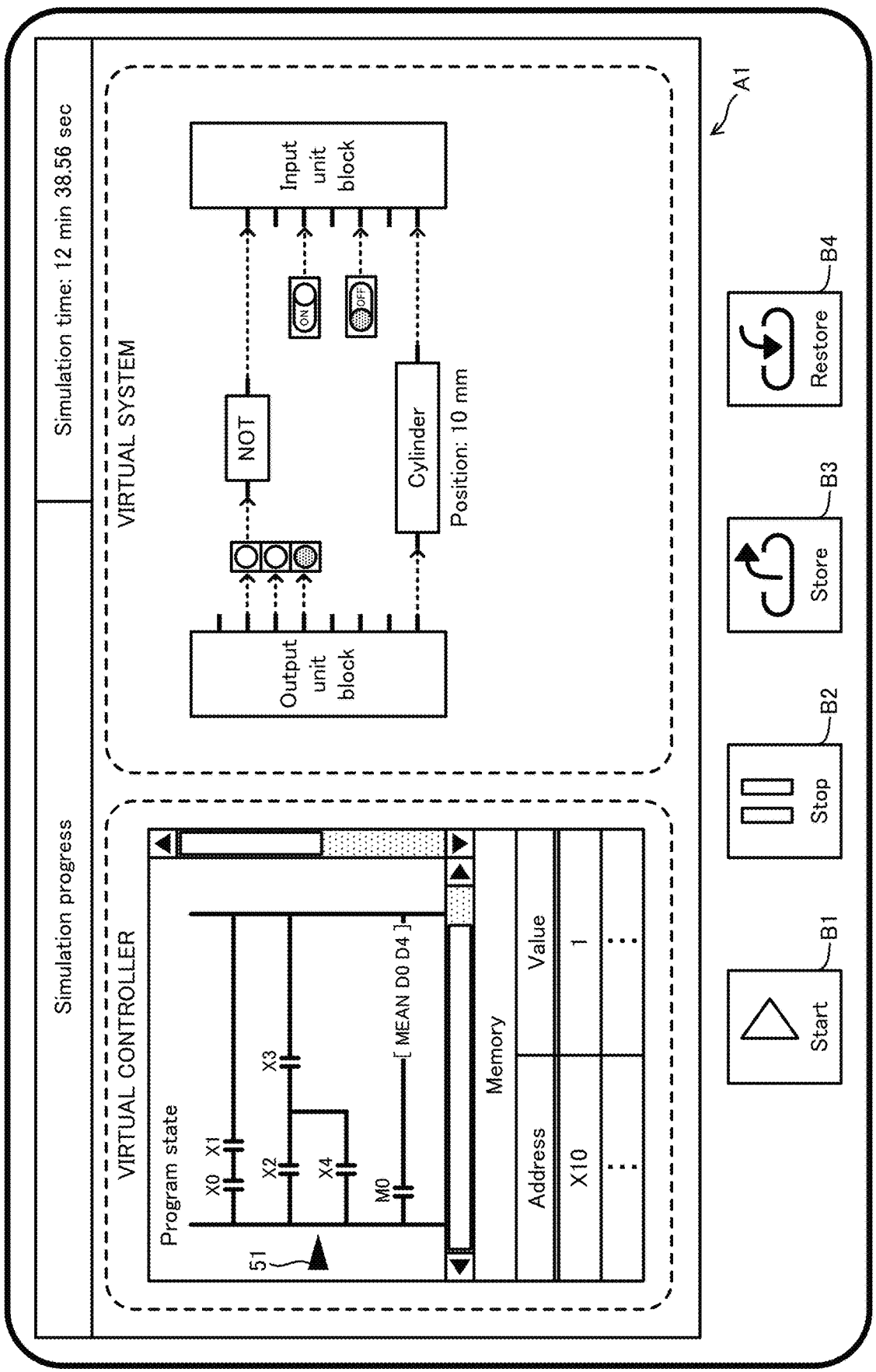
FIG. 6 is a diagram of a display example of simulation progress in the embodiment.

As illustrated in FIG. 6, the display 12 displays, for example, a simulation result. The simulation result includes simulation progress, or in other words, the result of the simulation in progress up to a specific timing. In the example in FIG. 6, a breakpoint of the execution program 21a executed by the virtual controller 31 is indicated by a triangular object 51, and each address in a memory in the virtual controller 31 and a value stored in the address are indicated in a manner associated with each other. Each value in the memory changes with the execution of the execution program 21a, and the virtual controller 31 generates a virtual output to the virtual system 32 using the value. The user can thus determine whether a process described in the execution program 21a is being performed correctly by monitoring the value.

As illustrated in the upper right area in FIG. 6, the display 12 displays the state of each element included in the virtual system 32 that changes as the simulation progresses. For example, the display 12 displays whether each lamp is turned on or turned off and whether each switch is in an ON state or an OFF state in a manner visually identifiable to the user, and displays a character string indicating the cylinder position.

During the simulation, the acquirer 11 acquires, from the user, instructions about the simulation progress through the screen displayed on the display 12. The instructions about the simulation progress include, for example, a stop instruction to temporarily stop the simulation, a restart instruction to restart the stopped simulation, an operation on the virtual controller 31, and an operation on an element in the virtual system 32 that receives a user input. The user selects a button B2 illustrated in FIG. 6 to input the stop instruction, and selects a button B1 to input the restart instruction. The user may operate a component included in an object displayed as in FIG. 3 or directly overwrite the value displayed in FIG. 6 to input an operation on the virtual controller 31. The user may operate an object displayed as in FIG. 6 to input an operation on a corresponding element included in the virtual system 32.

The acquirer 11 also acquires, as the instructions about the simulation, a storing instruction to store the current simulation state input by selecting a button B3 illustrated in FIG. 6, and a read instruction to read the stored simulation state input by selecting a button B4. The storing instruction is input, for example, when the user ends working, when the user leaves the seat, when the simulation device 10 is powered off, or when the state of the simulation in progress at the current time is determined to be used later for verification. The read instruction is input, for example, when the user starts working, when the user is seated, when the simulation device 10 is powered on, or when the simulation state is restored for verifying the past simulation progress. When an input of the read instruction is followed by an input of the start instruction, the simulation restarts from the read state.

The state data storage 13 is mainly implemented by the auxiliary storage 43. The state data storage 13 stores the state data indicating the simulation state at a time point at which the storing instruction is input. The state data indicates the execution program 21*a*, the breakpoint of the execution program 21*a*, data stored in the memory of the virtual controller 31, the controller configuration information, the system configuration information, and the state of each element in the virtual system 32. The state data is read from the state data storage 13 when the read instruction is input. The state data is used to restart the simulation midway. The state data storage 13 corresponds to an example of state data storage means for storing state data indicating the states of the virtual controller and the virtual system at a time point at which the simulations of the operations are stopped in response to a stop instruction.

The simulator 14 simulates the programmable controller 21 executing the execution program 21*a* by causing the virtual controller 31 to execute the execution program 21*a*. The simulator 14 builds the virtual controller 31 based on the execution program 21*a* and the controller configuration information, and builds the virtual system 32 based on the system configuration information.

The simulator 14 includes a memory that stores the same data as the programmable controller 21, and successively executes commands included in the execution program 21*a*. The simulator 14 clocks the simulation time that elapses when executing the commands. The simulation time is a virtual time that elapses when the virtual controller 31 executes the execution program 21*a* in the same manner as the actual time elapses when the programmable controller 21 executes the execution program 21*a*. For example, the simulator 14 clocks the simulation time based on time setting data illustrated in FIG. 7. The time setting data indicates each command included in the execution program 21*a* and the time length taken to execute the command in a manner associated with each other. The time setting data may be acquired by the acquirer 11 together with the execution program 21*a*.

The simulation time may elapse, similarly to the actual time, as each command is executed, and may not correspond to the actual time. The clocking of the simulation time and the simulation of the command execution may be performed simultaneously, or one of the clocking of the simulation time or the simulation of the command execution may be performed using the other of the clocking of the simulation time or the simulation of the command execution as the starting point. For example, the simulator 14 may execute, after causing the simulation time to elapse, a command executable within the elapsed simulation time, or may cause, after executing a command, the simulation time to elapse by a time length corresponding to the command.

The simulator 14 also simulates the operation of the virtual system 32. More specifically, the simulator 14 simulates a state change in each element in the virtual system 32 based on a virtual output from the virtual controller 31 that changes with the execution of the execution program 21*a*. The simulator 14 clocks the simulation time of the virtual system 32 separately from the simulation time of the virtual controller 31. In other words, the simulator 14 separately simulates the virtual controller 31 and the virtual system 32. The simulator 14 synchronizes, however, the simulation time of the virtual controller 31 and the simulation time of the virtual system 32 in predetermined cycles.

Figure 8:
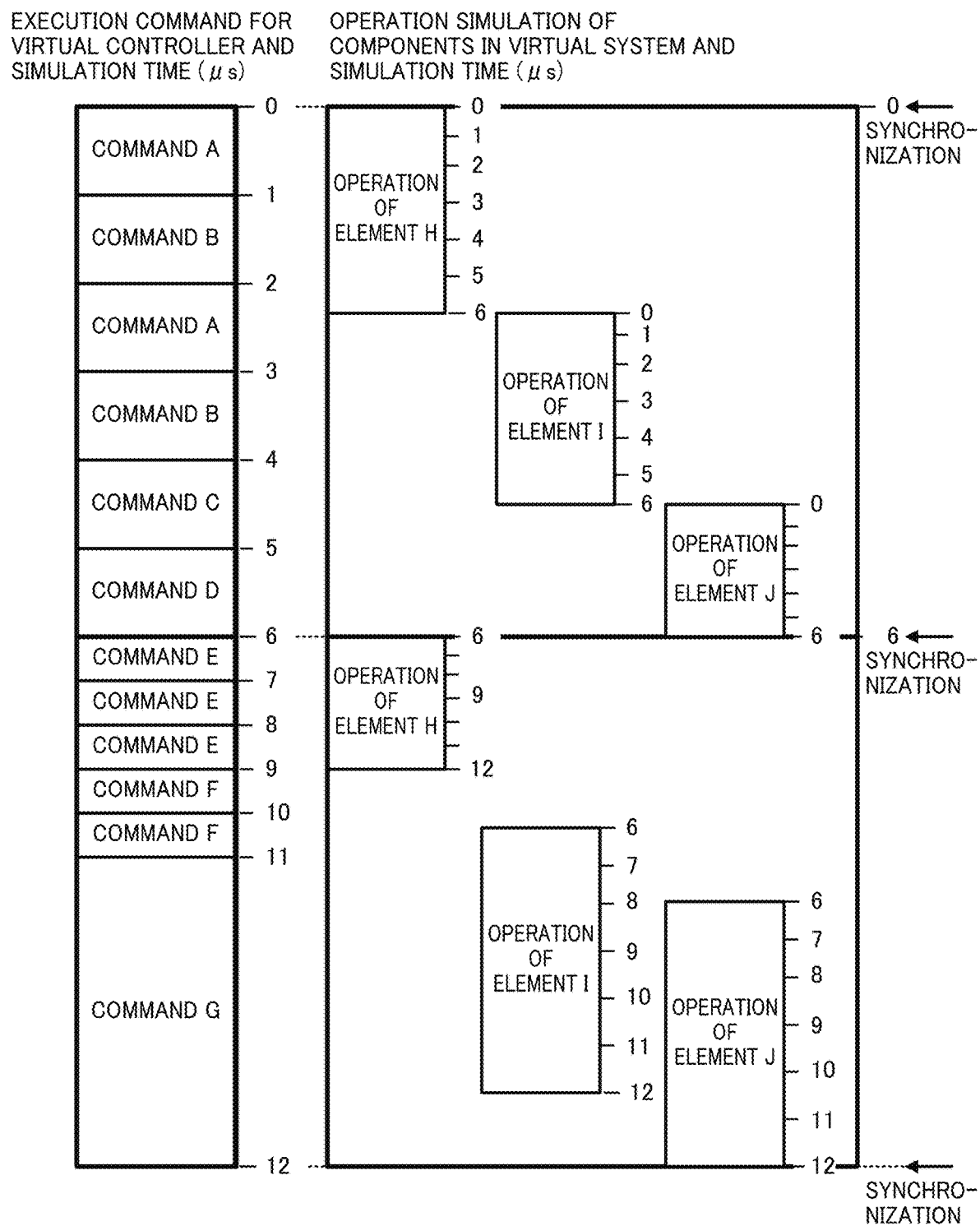
FIG. 8 is a diagram describing synchronization of simulation times in the embodiment.

FIG. 8 schematically illustrates synchronization of the simulation times. In the example in FIG. 8, the simulation times of the virtual controller 31 and the virtual system 32 are synchronized in cycles of 6 μs. More specifically, one of the virtual controller 31 or the virtual system 32 waits when the simulation time equal to a cycle length elapses after the last synchronization but the simulation time equal to the cycle length has not elapsed for the other of the virtual controller 31 or the virtual system 32, and starts the simulation in the next cycle when the simulation time equal to the cycle length has elapsed for the other.

The simulation times of the virtual controller 31 and the virtual system 32 may not be synchronized in each cycle. However, an error in synchronizing the simulation times of the virtual controller 31 and the virtual system 32 has the upper limit that is equal to the cycle length. The simulation times are thus synchronized with a relatively small error.

The simulator 14 further simulates the operations of the elements included in the virtual system 32. When connected to one another, the elements are affected by the virtual output from the virtual controller 31 in a specific sequence. The simulator 14 thus determines the sequence of the elements based on the system configuration information, and simulates the state changes in the elements in the determined sequence. More specifically, the simulator 14 generates a directed acyclic graph for multiple elements and performs topological sorting on the generated directed acyclic graph to determine the sequence of the elements. The connection relationship between elements with defined inputs and outputs is substantially equal to a directed acyclic graph, which can be generated with a commonly known method. Topological sorting on the provided directed acyclic graph may also be performed with a commonly known method, and thus is not described in detail.

In the example in FIG. 8, the operations of elements H, I, and J included in the virtual system 32 are simulated in this sequence. As illustrated in the cycle from 0 to 6 μs in FIG. 8, the simulator 14 may first simulate the operation of the element H in this cycle, then simulate the operation of the element I in this cycle, and simulate the operation of the element J in this cycle. Alternatively, as illustrated in the cycle from 6 to 12 μs in FIG. 8, the simulator 14 may simulate the operations of the elements I and J partially in parallel with the sequence of the elements I and J maintained. In other words, at a time point in the simulation time, or for example, at 8 μs, the simulation of the element I that is affected by the output from the virtual controller 31 before the element J may start before the simulation of the element J.

As illustrated in FIG. 9, when any of the components included in the virtual system 32 has two or more input terminals, two or more output terminals, or both, the directed acyclic graph may be generated using each terminal of the component as a node to determine the sequence of the terminals for which input and output signals are simulated. In other words, the sequence may be determined for the terminals of the components corresponding to the elements. Alternatively, each terminal may be used as an element included in the virtual system 32.

In the example in FIG. 9, the relationship between the components forms a loop, but the dependent relationship between the terminals forms no loop, allowing the directed acyclic graph to be generated. However, the connection relationship between the elements or the dependent relationship between the terminals may form a loop. In this case, the directed acyclic graph may be generated by determining the sequence of the elements or the terminals using, as the starting point, the element or the terminal connected to the virtual controller 31 and using, as the end point, the node immediately before a connection relationship that forms a loop. For example, when a terminal J2 in FIG. 9 depends on a terminal J1 in addition to a terminal J3, the graph may be generated with the dependent relationship between the terminals J1 and J2 eliminated.

The simulation time of the virtual controller 31 corresponds to an example of a first simulation time, and the simulation time of the virtual system 32 corresponds to an example of a second simulation time. The simulator 14 corresponds to an example of simulation means for simulating the operations of the programmable controller and the system by synchronizing, in predetermined cycles, the first simulation time of a virtual controller corresponding to the programmable controller and the second simulation time of a virtual system built based on the system configuration information and causing the virtual system to operate based on a virtual output acquired from the virtual controller executing the execution program.

Figure 10:
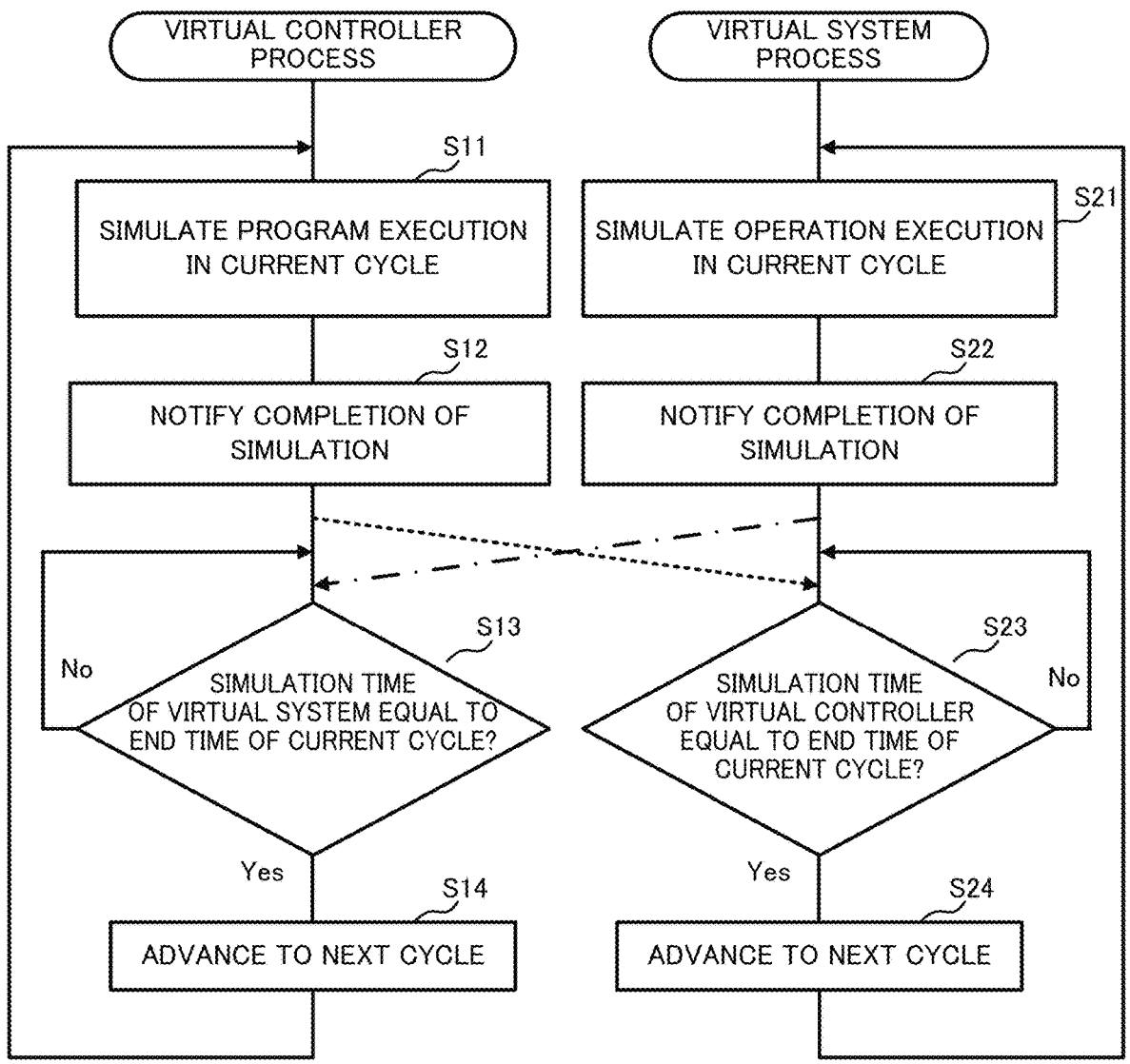
FIG. 10 is a flowchart of a virtual controller process and a virtual system process in the embodiment.

Processing performed by the simulation device 10 is now described with reference to FIGS. 10 and 11. FIG. 10 schematically illustrates procedures of a virtual controller process performed by the virtual controller 31 and a virtual system process performed by the virtual system 32.

In the virtual controller process, the virtual controller 31 simulates the execution of the execution program 21a in the current cycle (step S11). More specifically, the simulator 14 refers to the time setting data and successively executes commands included in the processing described in the execution program 21a and executable in the cycle with the predetermined length.

When the execution of commands in the cycle completes, the virtual controller 31 notifies the virtual system 32 of the completion of the operation simulation in the cycle (step S12). In FIG. 10, the notification is indicated with a broken arrow.

The virtual controller 31 then determines whether the simulation time of the virtual system 32 is equal to the end time of the current cycle (step S13). More specifically, the virtual controller 31 determines whether the notification of the completion of the simulation is received from the virtual system 32.

When the determination result in step S13 is negative (No in step S13), the virtual controller 31 repeats the determination in step S13 and waits, without continuing the execution of the execution program 21a, until the determination result is affirmative. When the determination result in step S13 is affirmative (Yes in step S13), the virtual controller 31 advances to the next cycle (step S14) and returns to step S11 to continue the execution of the execution program 21a.

In the virtual system process, the virtual system 32 simulates the operation of each element in the current cycle (step S21). More specifically, the simulator 14 refers to the system configuration information and simulates the state change in each element in the cycle with the predetermined length based on the output from the virtual controller 31.

After the simulation completes, the virtual system 32 notifies the virtual controller 31 of the completion of the operation simulation in the cycle (step S22). In FIG. 10, the notification is indicated with a dot-dash arrow.

The virtual system 32 then determines whether the simulation time of the virtual controller 31 is equal to the end time of the current cycle (step S23). More specifically, the virtual system 32 determines whether the notification of the completion of the simulation is received from the virtual controller 31.

When the determination result in step S23 is negative (No in step S23), the virtual system 32 repeats the determination in step S23, and waits, without continuing the simulation, until the determination result is affirmative. When the determination result in step S23 is affirmative (Yes in step S23), the virtual system 32 advances to the next cycle (step S24) and returns to step S21 to continue the simulation.

Figure 11:
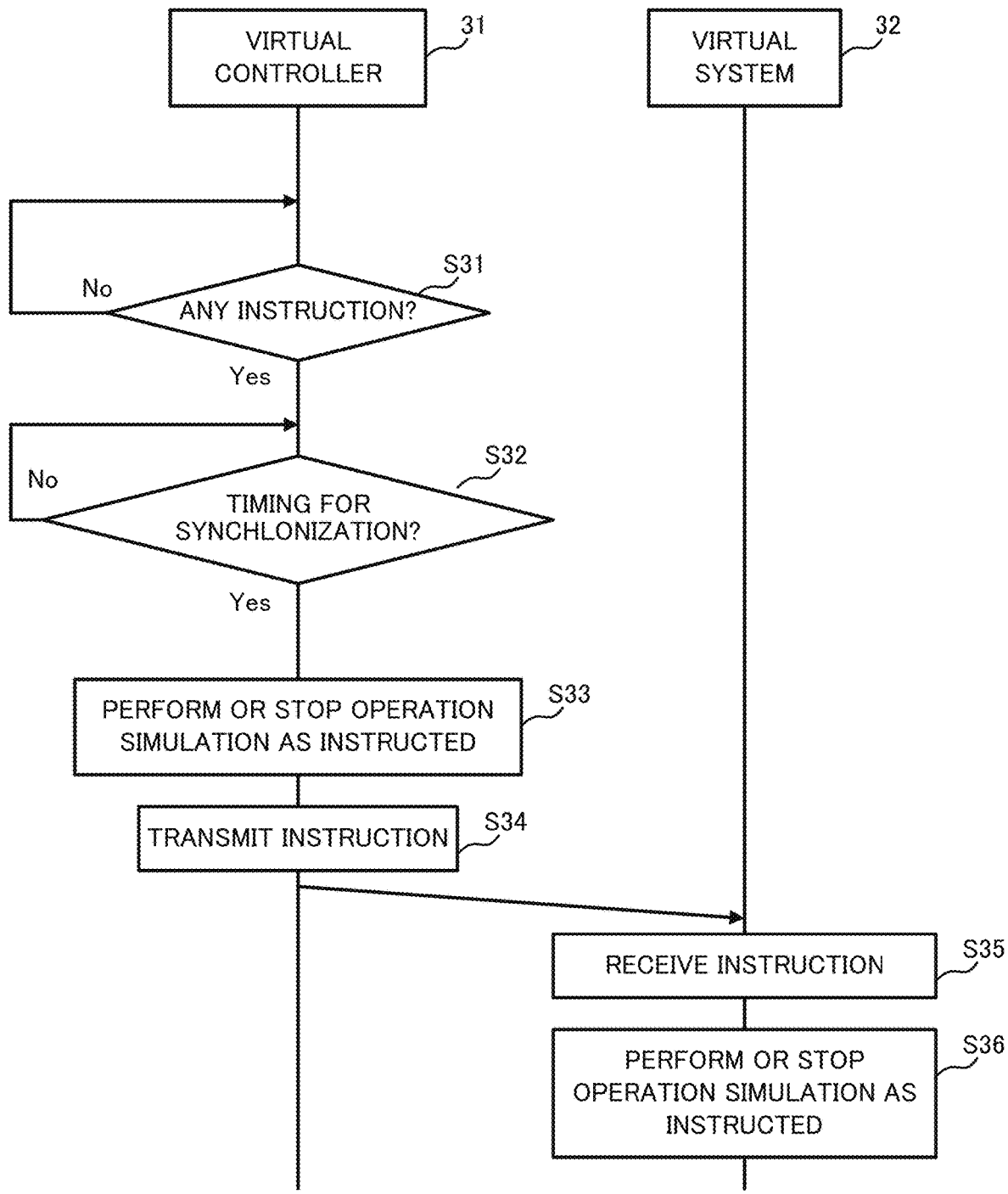
FIG. 11 is a flowchart illustrating example transmission of an instruction to perform or stop simulations of a virtual controller and a virtual system in the embodiment.

FIG. 11 illustrates the procedure of processing performed by the virtual controller 31 and the virtual system 32 when an instruction indicating whether to perform simulations is input. More specifically, the virtual controller 31 determines whether the instruction indicating whether to perform simulations is input (step S31). The instruction indicating whether to perform simulations is an instruction to start or restart the simulations, or to stop the simulations.

When determining that no instruction is input (No in step S31), the virtual controller 31 repeats the determination in step S31. When determining that the instruction is input (Yes in step S31), the virtual controller 31 determines whether the simulation time is the timing for synchronization (step S32). When determining that the simulation time is not the timing for synchronization (No in step S32), the virtual controller 31 repeats the determination in step S32 and waits until the simulation time reaches the timing for synchronization. When determining that the simulation time is the timing for synchronization (Yes in step S32), the virtual controller 31 executes the execution program 21a or stops the execution as instructed (step S33). The virtual controller 31 thus performs the simulations until the timing for synchronization when the stop instruction is input during the simulations. When the instruction to start or restart the simulations is input in step S31 with the virtual controller 31 stopping the simulations, step S32 may be eliminated.

The virtual controller 31 then transmits, to the virtual system 32, the instruction determined as having been input in step S31 (step S34).

The virtual system 32 receives the transmitted instruction (step S35) and performs or stops the simulation as instructed (step S36). Thus, when the stop instruction is input, both the virtual controller 31 and the virtual system 32 stop the simulations at the timing to synchronize the simulation times. The processing illustrated in FIGS. 10 and 11 corresponds to an example of a simulation method performed by the simulation device.

As described above, the simulator 14 stops the simulations of the operations at the timing to synchronize the simulation time of the virtual controller 31 and the simulation time of the virtual system 32. The simulator 14 can thus restart the simulations of the operations of the programmable controller 21 and the FA system 22 that have progressed equally. The programmable controller 21 and the FA system 32 can thus be simulated accurately.

The simulator 14 also determines the sequence of the elements in the virtual system 32 based on the system configuration information, and simulates the state change in each element in the determined sequence. The virtual system 32 can thus be simulated accurately. More specifically, the simulator 14 generates the directed acyclic graph for multiple elements and performs topological sorting of the generated directed acyclic graph to determine the sequence of the elements. With a known efficient algorithm for generating and topologically sorting a directed acyclic graph, the simulator 14 can rapidly determine the sequence of the elements.

The state data storage 13 in the present embodiment stores the state data indicating the states of the virtual controller 31 and the virtual system 32. When the acquirer 11 acquires the instruction to read the state data, the simulator 14 restores the states of the virtual controller 31 and the virtual system 32 indicated by the state data. The state of the virtual controller 31 refers to a simulation time value at a specific simulation time point, an execution state of the execution program 21a, the controller configuration information, and the states of the virtual units included in the virtual controller 31. The execution state of the execution program 21a includes the execution program 21a, the breakpoint of the execution program 21a, and data to be set for the execution program 21a. The state of the virtual system 32 refers to the system configuration information, the simulation time of the virtual system 32, and the state of each element. This allows the simulations to restart midway without starting from the beginning again. For example, this allows the simulations to start, with a device startup sequence for the programmable controller 21 and the FA system 22 complete, to reduce the time taken to analyze simulation results.

Although one or more embodiments of the present disclosure have been described above, the present disclosure is not limited to the above embodiments.

For example, the virtual controller 31 in the above embodiment is built based on the controller configuration information indicating the configuration of the building block programmable controller 21, but may be built differently. For example, instead of the controller configuration information, information indicating the model number of the programmable controller 21 integrally having the functions of the above multiple units may be provided to the simulation device 10 to build the virtual controller 31.

For example, one of the virtual controller 31 or the virtual system 32 in the above embodiment informs the other of the virtual controller 31 or the virtual system 32 of the completion of the operation simulation in the cycle in the simulation time, but may operate differently. One of the virtual controller 31 or the virtual system 32 may inform the other of the virtual controller 31 or the virtual system 32 of the clocked simulation time, and determine whether the simulation time informed from the other is equal to the end time of the cycle.

The functions of the simulation device 10 may be implemented by dedicated hardware or a general-purpose computer system.

For example, the program P1 executable by the processor 41 may be stored in a non-transitory computer-readable recording medium for distribution. The program P1 is installed in a computer to provide a device that performs the above processing. Examples of such non-transitory recording medium include a flexible disk, a compact disc read-only memory (CD-ROM), a digital versatile disc (DVD), and a magneto-optical (MO) disk.

The program P1 may be stored in a disk device included in a server on a communication network, such as the Internet, and may be, for example, superimposed on a carrier wave to be downloaded to a computer.

The above processing may also be performed by the program P1 activated and executed while being transferred through a communication network.

The above processing may be also performed by entirely or partially executing the program P1 on a server while a computer is transmitting and receiving information about the processing through a communication network.

In the system with the above functions implementable partially by the operating system (OS) or through cooperation between the OS and applications, portions implementable by applications rather than the OS may be stored in a non-transitory recording medium for distribution or may be downloaded to a computer.

Means for implementing the functions of the simulation device 10 is not limited to software. The functions may be partially or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The technique according to one or more embodiments of the present disclosure is applicable to simulating the operations of a programmable controller and peripheral devices of the programmable controller.

REFERENCE SIGNS LIST

10 Simulation device
11 Acquirer

12 Display
13 State data storage
14 Simulator
21 Programmable controller
21a Execution program
22 FA system
22a, 22b, 22c, 22d Element
31 Virtual controller
32 Virtual system
41 Processor
42 Main storage
43 Auxiliary storage
44 Input device
45 Output device
46 Communicator
47 Internal bus
51 Object
B1 to B4 Button
P1 Program

The invention claimed is:

1. A non-transitory computer-readable recording medium storing a simulation program executable by a computer to simulate an operation of a programmable controller and an operation of a system operable based on an output from the programmable controller, the simulation program causing the computer to function as:
an acquirer to acquire an execution program executable by the programmable controller to generate the output from the programmable controller and acquire system configuration information indicating a configuration of the system; and
a simulator to perform simulations of the operation of the programmable controller and the operation of the system by synchronizing, in predetermined cycles, a first simulation time of a virtual controller corresponding to the programmable controller and a second simulation time of a virtual system built based on the system configuration information and causing the virtual system to operate based on a virtual output acquired from the virtual controller executing the execution program,
wherein the virtual system includes a plurality of components including a component having two or more input terminals, two or more output terminals, or both,
each of a plurality of elements included in the virtual system is connected to another element of the plurality of elements, performs at least one of receiving a signal output from the other element of the plurality of elements or transmitting a signal to the other element of the plurality of elements, and has, when receiving the signal from the other element of the plurality of elements, a state changeable based on the signal, each of the plurality of elements being corresponding to the input terminal or the output terminal of the component of the plurality of components,
the system configuration information indicates the plurality of elements, a connection relationship between the plurality of elements, and information about the state of each of the plurality of elements including dependent relationship indicating a state of the output terminal depending on a state of the input terminal of the component,
the simulator generates a directed acyclic graph for the plurality of elements based on the system configuration information, performs topological sorting on the generated directed acyclic graph to determine the sequence of the plurality of elements, and simulates a change in the state of each of the plurality of elements in the determined sequence,
the acquirer acquires a stop instruction to stop the simulations performed by the simulator, and
the simulator stops, when the acquirer acquires the stop instruction, the simulations of the operation of the virtual controller and the operation of the virtual system at a timing of the predetermined cycle to synchronize the first simulation time and the second simulation time.

2. The non-transitory computer-readable recording medium according to claim 1, wherein
the system is a control target of the programmable controller and includes no other programmable controllers.

3. The non-transitory computer-readable recording medium according to claim 1, the program further causing the computer to function as:
state data storage to store state data indicating a state of the virtual controller at a timing at which the simulation of the operation of the virtual controller is stopped based on the stop instruction and indicating a state of the virtual system at a timing at which the simulation of the operation of the virtual system is stopped based on the stop instruction,
wherein the acquirer acquires a read instruction to read the state data, and
the simulator reads, when the acquirer acquires the read instruction, the state data from the state data storage and restores the state of the virtual controller and the state of the virtual system indicated by the read state data.

4. The non-transitory computer-readable recording medium simulation-program according to claim 3, wherein
the programmable controller includes a base unit and, as a unit attached to the base unit, an execution unit to execute the execution program and at least one of a network unit to communicate through a network, a motion unit to control a servo system, or an input-output unit to transmit or receive an external signal,
the acquirer acquires controller configuration information indicating units included in the programmable controller,
the simulator builds the virtual controller based on the controller configuration information, and
the state data includes the controller configuration information and the system configuration information.

5. The non-transitory computer-readable recording medium according to claim 4, wherein
the state data indicates, as the state of the virtual controller, an execution state of the execution program and a state of virtual units corresponding to the units indicated by the controller configuration information.

6. A simulation method implementable with a simulation device to simulate an operation of a programmable controller and an operation of a system operable based on an output from the programmable controller, the method comprising:
acquiring, with an acquirer, an execution program executable by the programmable controller to generate the output from the programmable controller, and system configuration information indicating a configuration of the system;
performing, with a simulator, simulations of the operation of the programmable controller and the operation of the system by synchronizing, in predetermined cycles, a first simulation time of a virtual controller corresponding to the programmable controller and a second simulation time of a virtual system built based on the system configuration information and causing the virtual system to operate based on a virtual output acquired from the virtual controller executing the execution program;

acquiring, with the acquirer, a stop instruction to stop the simulations performed with the simulator simulation means; and stopping, with the simulator, when the stop instruction is acquired with the acquirer, the simulations of the operation of the virtual controller and the operation of the virtual system at a timing of the predetermined cycle to synchronize the first simulation time and the second simulation time, wherein the virtual system includes a plurality of components including a component having two or more input terminals, two or more output terminals, or both, each of a plurality of elements included in the virtual system is connected to another element of the plurality of elements, performs at least one of receiving a signal output from the other element of the plurality of elements or transmitting a signal to the other element of the plurality of elements, and has, when receiving the signal from the other element of the plurality of elements, a state changeable based on the signal, each of the plurality of elements being corresponding to the input terminal or the output terminal of the component of the plurality of components, the system configuration information indicates the plurality of elements, a connection relationship between the plurality of elements, and information about the state of each of the plurality of elements including dependent relationship indicating a state of the output terminal depending on a state of the input terminal of the component, the simulator generates a directed acyclic graph for the plurality of elements based on the system configuration information, performs topological sorting on the generated directed acyclic graph to determine the sequence of the plurality of elements, and simulates a change in the state of each of the plurality of elements in the determined sequence.

7. A simulation device for simulating an operation of a programmable controller and an operation of a system operable based on an output from the programmable controller, the simulation device comprising:

processing circuitry to acquire an execution program executable by the programmable controller to generate the output from the programmable controller and acquire system configuration information indicating a configuration of the system; and perform simulations of the operation of the programmable controller and the operation of the system by synchronizing, in predetermined cycles, a first simulation time of a virtual controller corresponding to the programmable controller and a second simulation time of a virtual system built based on the system configuration information and causing the virtual system to operate based on a virtual output acquired from the virtual controller executing the execution program, wherein the virtual system includes a plurality of components including a component having two or more input terminals, two or more output terminals, or both, each of a plurality of elements included in the virtual system is connected to another element of the plurality of elements, performs at least one of receiving a signal output from the other element of the plurality of elements or transmitting a signal to the other element of the plurality of elements, and has, when receiving the signal from the other element of the plurality of elements, a state changeable based on the signal, each of the plurality of elements being corresponding to the input terminal or the output terminal of the component of the plurality of components, the system configuration information indicates the plurality of elements, a connection relationship between the plurality of elements, and information about the state of each of the plurality of elements including dependent relationship indicating a state of the output terminal depending on a state of the input terminal of the component, the processing circuitry generates a directed acyclic graph for the plurality of elements based on the system configuration information, performs topological sorting on the generated directed acyclic graph to determine the sequence of the plurality of elements, and simulates a change in the state of each of the plurality of elements in the determined sequence, the processing circuitry acquires a stop instruction to stop the performed simulations, and the processing circuitry stops, when acquiring the stop instruction, the simulations of the operation of the virtual controller and the operation of the virtual system at a timing of the predetermined cycle to synchronize the first simulation time and the second simulation time.

* * * * *